United States Patent [19]

Heckles

[11] 4,146,522

[45] Mar. 27, 1979

[54] SMOKE SUPPRESSANT COMPOSITION

[75] Inventor: John S. Heckles, Lancaster, Pa.

[73] Assignee: Armstrong Cork Company, Lancaster, Pa.

[21] Appl. No.: 765,637

[22] Filed: Feb. 4, 1977

[51] Int. Cl.² .............................. C08K 3/22; C08K 5/04
[52] U.S. Cl. .......................... 260/29.1 R; 260/23 XA; 260/45.7 R; 260/45.75 W; 260/873
[58] Field of Search ................. 260/45.7 R, 45.75 W, 260/29.1 R, 873

[56] References Cited

U.S. PATENT DOCUMENTS

| | | | |
|---|---|---|---|
| 2,326,233 | 8/1943 | Leatherman | 260/29.1 R |
| 2,379,252 | 6/1945 | Muskat et al. | 106/179 |
| 2,610,920 | 9/1952 | Hopkinson | 260/45.75 W |
| 2,711,997 | 6/1955 | Trieschmann et al. | 260/29.1 R |
| 2,789,968 | 4/1957 | Reynolds et al. | 260/77.5 D |
| 2,821,539 | 1/1958 | Newman et al. | 260/29.1 R |
| 3,305,605 | 2/1967 | Hostettler et al. | 260/899 |
| 3,900,441 | 8/1975 | King | 260/45.75 W |
| 3,945,974 | 3/1976 | Schwarcz et al. | 260/45.75 W |
| 3,957,723 | 5/1976 | Lawson et al. | 260/45.75 W |
| 3,965,068 | 6/1976 | Dickens, Jr. | 260/45.75 W |
| 3,996,142 | 12/1976 | White et al. | 260/45.75 W |

*Primary Examiner*—Donald E. Czaja
*Assistant Examiner*—R. A. White

[57] ABSTRACT

Polymeric compositions comprising a polyhalocarbon resin and a carbonate plasticizer exhibit excellent smoke-suppressant properties. The polymeric compositions can also be formulated to include zinc oxide.

6 Claims, No Drawings

SMOKE SUPPRESSANT COMPOSITION

BACKGROUND OF THE INVENTION

1. Field of the Invention

This invention relates to smoke suppressed polymeric compositions. More particularly it relates to flame-retardant and low-smoke vinyl resin compositions.

2. Description of the Prior Art

There is a growing concern about the fire safety of a variety of consumer products. As such, a growing recognition that injuries and fatalities arising from fire and flame accidents are not primarily due to burns, but rather to smoke, gases, and oxygen deficiency. Those polymeric compositions containing relatively high percentages of halogen, either chemically attached to the polymer substrate or physically added as plasticizers, are generally considered flame retardant. In this respect, an important flame-retardant, halogen-containing polymer is poly(vinyl chloride). PVC, in its rigid form, is often used in buildings, aircraft, and the like. Rigid vinyl chloride, while being an acceptable flame retardant, has much higher levels of smoke production than considered desirable. In its plasticized form, as in fabrics, upholstery, and surface coverings, additional flammability and smoke generating problems are created whose alleviation has to date been subject to enormous research and development effort. In this respect, a myriad of inorganic materials have been found to function as flame retardants in poly(vinyl chloride)-based compositions. Antimony oxide-containing vinyl compositions have always been regarded as generally flame retardant, although not necessarily smoke retardant. Other metal oxides have served to diminish the disadvantages of antimony oxide in this respect; however, oxides such as calcium oxide and zinc oxide have been noted as detrimental when used in urethane systems so as to partially replace antimony oxide. In U.S. Pat. No. 3,957,723, Lawson et al., it has been disclosed that poly(vinyl chloride) systems containing zinc oxide with aluminum oxide trihydrate are of reduced flammability and diminished smoke intensity. Other PVC-based compositions have been noted to be fire and smoke retardant by the addition of zinc tungstate (see U.S. Pat. No. 3,901,850). Generally, it has been recognized that the incorporation of various mineral flame retardants in a polymer composition results in the diminished flammability of the polymers. But, concurrently, the emission of increased quantities of smoke occurs as a result of the increased tendency of the polymer to smolder. It has, therefore, been desirable to have additives, in addition to the flame retardant mineral ones, that are active in suppressing smoldering polymers. As a result, a variety of mineral/organic flame retardant/smoke retardant compositions have been found to achieve this result. For example, Elcik, in U.S. Pat. No. 3,983,290, has disclosed that zinc borate is useful in PVC compositions containing a phosphate ester plasticizer. Metal/organic complexes, such as ferrocenes, have also found to be similarly effective to this regard. It has been subsequently established that smoke retardant additives for vinyl chloride polymers should adhere to a number of conditions to make them practically usable. The smoke-retardant additive should be effective within the range of combustion temperatures of the poly(vinyl chloride) polymer composition so as to inhibit smoldering. Further, smoke-retardant additives should be sufficiently compatible with all constituents of the polymeric composition, that is, resinous polymers, stabilizers, plasticizers, and the like, both primary and secondary, antioxidants, flame retardants and others, to remain incorporated under conditions of formulation and use. Additionally, the additives should be sufficiently compatible so they can be mixed and fused into coherent, homogeneous material with good stability and will not separate easily from the final compounded formulation when a stress is imposed upon the system, such as occurs during processing. Chemical stability is a further significant aspect of compatibility of the additive in the formulation, and such should not enhance degradation during processing nor by normal aging.

SUMMARY OF THE INVENTION

It is an object of this invention to provide a new smoke-retardant composition which can be used alone or together with other additives in polyhalocarbon resins to reduce emission of smoke and promote enhanced flame retardancy upon the burning of such compositions.

It is a further object of this invention to provide a smoke-retardant additive for poly(vinyl chloride) compositions which is compatible with the other constituents of the polymeric composition under conditions of formulation and use.

It is another object of the present invention to provide smoke-retardant properties without undue impairment of critical polymer properties in poly(vinyl chloride) resinous compositions.

These and other objects of the present invention have been attained by the incorporation of a high oxygen content organic carbonate into a vinyl chloride polymer composition.

DESCRIPTION OF THE PREFERRED EMBODIMENTS

The flame-retardant and smoke-suppressed composition of the present invention can be obtained by the incorporation of a high oxygen content organic carbonate plasticizer into a halocarbon polymeric composition comprising a vinyl chloride resin and stabilizer. As a result, the polymeric composition formed is flame retardant and substantially reduced in smoke generation in both the flaming and the non-flaming modes.

High oxygen content plasticizers for use as additives in vinyl chloride and vinylidene chloride rigid and plasticized polymer compositions in accordance with the present invention comprise various symmetrical and unsymmetrical organic carbonates. The term "high oxygen content" as used herein is related to di-2-ethylhexyl phthalate (DOP), one of the most common plasticizers of the polyhalocarbons. This material has an oxygen content of 16%. The high oxygen content plasticizers of this invention are those having an oxygen content of greater than that of DOP, e.g. 16%. For example, the unsymmetrical organic monocarbonate plasticizer 2-(2-butoxyethoxy)ethyl-ethyl carbonate (BEE-E carbonate) has an oxygen content of 36%. The symmetrical mono-organic carbonate plasticizer 1,4-butanediol bis(ethylcarbonate) has an oxygen content of 41%. These and other symmetrical and unsymmetrical organic monocarbonate plasticizers are represented by the formula

where R and R' can be the same or different and are linear or branched $C_1$ to $C_8$ alkyl, $C_1$ to $C_8$ alkoxy-$C_1$ to $C_8$ alkyl, or mixtures thereof.

These organic carbonates are useful in amounts (based on weight per hundred parts of halocarbon polymer) of from 1 to 80 phr, preferably 5–40 phr. The use of greater than about 80 phr plasticizer adversely affects other important physical properties of the final formula, such as stain resistance and tensile strength.

These organic monocarbonates in accordance with the present invention are prepared by the method of Caruthers et al., J. Amer. Chem. Soc., 52, 314–26 (1930). As examples of the above-referenced method of preparation, the symmetrical dialkyl and dialkoxyalkyl monocarbonates of this invention are prepared by reacting one mole of diethyl carbonate with 3 moles of the alcohol with sodium catalyst. The following equation illustrates the preparation of these carbonate plasticizers:

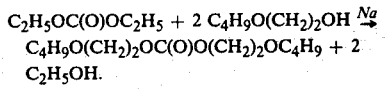

$$C_2H_5OC(O)OC_2H_5 + 2\ C_4H_9O(CH_2)_2OH \xrightarrow{Na}$$
$$C_4H_9O(CH_2)_2OC(O)O(CH_2)_2OC_4H_9 + 2\ C_2H_5OH.$$

The carbonates are water white, low viscosity, thermally stable liquids.

High oxygen content organic polycarbonates represent a further embodiment in accordance with the present invention and are also useful in the polyhalocarbon formulations as smoke suppressants. These materials are of the general formula

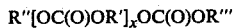

$$R''[OC(O)OR']_xOC(O)OR'''$$

wherein R' is as defined above, R'' is $C_1$ to $C_8$ alkylene, R''' is $C_1$ to $C_8$ alkyl and where x is 2–100, preferably 2–6.

These may be unsymmetrical polycarbonates or symmetrical polycarbonates. These organic polycarbonates are useful in the compositions of the present invention in from about 1 to about 80 phr, preferably 5 to 40 phr. These compounds are prepared in the manner similar to the monocarbonate disclosed above. Methods illustrating the preparation of organic polycarbonates suitable for use are set forth below in the examples. Generally, it has been found that the incorporation of a further additive, an oxide, hydroxide or salt of zinc, further reduces the amount of smoke in the organic carbonate plasticized compositions of this invention. Preferably, the zinc compound is blended into the formula in from about 0.01 to about 20 parts by weight per 100 parts of polyhalocarbon. Most preferably about 1 to about 5 phr by weight of zinc oxide per 100 parts of polyhalocarbon resin is incorporated in these formulations.

Mixtures of the polymeric and monomeric symmetrical and unsymmetrical organic carbonates can also be employed in these smoke-retardant compositions.

Halocarbon polymers used in this invention include homopolymers, copolymers and blends of homopolymers and/or copolymers, such as illustrated by various poly(vinyl chloride) resins. These copolymers may contain from 0 up to about 50% by weight of at least one other olefinically unsaturated monomer, more preferably at least one other vinylidene monomer (i.e. monomer containing at least one terminal $CH_2=C<$ group per molecule) copolymerized therewith, more preferably up to about 20% by weight of such monomer. Suitable monomers include 1-olefins containing from 2 to 12 carbon atoms, more preferably from 2 to 8 carbon atoms, such as ethylene, propylene, 1-butene, isobutylene, 1-hexene, 4-methyl-1-pentene and the like; dienes containing from 4 to 10 carbon atoms including conjugated dienes as butadiene, isoprene, piperylene and the like; ethylidene norbornene and dicyclopentadiene; vinyl esters and allyl esters such as vinyl acetate, vinyl chloroacetate, vinyl propionate, vinyl laurate, allyl acetate and the like; vinyl aromatics such as styrene, $\alpha$-methyl styrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as $\alpha$-cyanomethyl acrylate, the $\alpha$-, $\beta$- and $\gamma$- cyanopropyl acrylates and the like; olefinically unsaturated carboxylic acids and esters thereof; including $\alpha,\beta$-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methylmethacrylate, ethyl methacrylate, butyl methacrylate, glycidyl methacrylate and the like, and including esters of maleic and fumaric acid and the like; amides of the $\alpha,\beta$-olefinically unsaturated carboxylic acids such as acrylamide and the like; divinyls, diacrylates and other polyfunctional monomers such as divinyl benzene, divinyl ether, diethylene glycol diacrylate, ethylene glycol dimethacrylate, methylene-bis-acrylamide, allyl pentaerythritol, and the like; bis-($\beta$-haloalkyl)alkenyl phosphonates such as bis($\beta$-chloroethyl) vinyl phosphonate and the like.

The halocarbon polymers may be prepared by any method known to the art such as by emulsion, suspension, bulk or solution polymerization. The additive compounds may be mixed with the polymer emulsion, suspension, solution or bulk mass before monomer recovery and/or drying. More preferably, the compounds may be mixed with dry granular or powdered polymers. The polymer and compound may be mixed thoroughly in granular or powder form in apparatus such as a Henschel mixer and the like. Alternatively, this step may be eliminated and the mixing done while the polymer mass is fluxed, fused and masticated to homogeneity under fairly intensive shear in or on a mixer apparatus having its metal surface in contact with the material. The fusion temperature and time will vary according to the polymer composition and level of additive compound, but will generally be in the range of about 300° to 400° F. and 2 to 10 minutes.

Most of the commercially available PVC plasticizers can be successfully incorporated into these compositions. The common types include monomeric or polymeric esters of adipic, azelaic, oleic, phosphoric, sebacic, stearic, phthalic or trimellitic acid and of allyl alcohol, glycerol, butanol, isobutanol, pentanol(s), (methyl) cyclohexanol(s), 2-ethylhexanol, octanol(s), benzyl alchohol, tetrahydrofurfuryl alcohol, propylene glycol, diethylene glycol, dipropylene glycol, triethylene glycol, tripropylene glycol, polyethylene glycol(s) or polypropylene glycols. The choice of type, of course, will be dictated by the desired level of properties and performance of the end product.

Suitable stabilizers for use in the present composition include those conventionally used for stabilizing the polymers employed, e.g. barium-cadmium stearate, laurate or oleate (7 to 15% metal content), (e.g. Ferro 75-001, trademark); barium-zinc octoate (7 15% metal content), (e.g. Ferro 75-001, trademark); barium-zinc octoate (e.g. Synpron 744, trademark Synthetic Products Company); liquid epoxy resin (e.g. bis[3,4-epoxy-6-methylcyclohexylmethyl] adipate, Ciba CY 178, trademark); phosphate chelator (e.g. tri[nonylated phenyl] phosphite, Mark C, trademark); ultraviolet absorber (e.g. 2-[2'-hydroxyphenyl-5-ethyl] benzotriazole, Tinuvin 328, trademark); antioxidant (e.g. tetrakis [methylene 3-(3',5'-di-t-butyl-4'-hydroxyphenyl) propionate] methane, Irganox 1010, trademark).

The vinyl chloride and vinylidene chloride polymer compositions of this invention may contain the usual compounding ingredients known to the art such as fillers, opacifiers, lubricants, processing aids, impact modifying resins, antioxidants, and the like.

The term flaming and non-flaming modes is derived from using the NBS Smoke Density Chamber Test. This test is described in great detail in the article by D. Gross, J. J. Loftus, and A. F. Robertson, ASTM Special Technical Publication 422, pages 166-204 (1969). In this test, the maximum specific optical density, $D_m$, corrected for soot deposits on smoke density chamber cell windows is obtained. The examples illustrated herein disclose the average smoke value per gram, SV/g or $D_m$(corr)/g of each sample tested for both flaming (f) and non-flaming (s) modes. The use of $D_m$(corr) or SV/g allows for the correction of the smoke density value for sample weight and, therefore, is valid for samples which are quite thin but have about the same weight. A maximum average $D_m$(corr) value of 450, as determined in the NBS Smoke Density Chamber, has been adopted as a regulation value for interior finishes, including floorings and the like, by the U.S. Department of Health, Education and Welfare.

In the examples that follow, smoke generated by the poly(vinyl chloride) resin-containing compositions was measured by the method described above using an instrument designated Model 4-5800, Aminco-NBS Smoke Density Chamber, American Instrument Company.

Test samples were made by blending the smoke suppressant composition with the thermoplastic resins upon weight basis in terms of parts per hundred of resin (PHR) in typical formula well known in the industry.

Additives were blended with the thermoplastic resins by milling at a temperature of about 160° C. to 170° C. for five to ten minutes. The sheets were removed from the mill, allowed to cool, and test samples were then cut from the sheet. Sheets obtained in this manner were approximately 14 inches wide by about 0.020 inches in thickness. Test samples for smoke determinations were cut from the sheets produced in this manner.

In accordance with the test procedure mentioned above, each sample was exposed to an energy flux of 2.5 w/cm² from a radiant heater under flaming conditions. Flames from a multi-directional propane burner impinged upon the sample and then into the trough at the bottom of the sample altered during these measurements.

The sample was exposed until a minimum transmittance value was obtained. After the smoke had been flushed from the cabinet, the residual attenuation of the light beam, caused by deposits on the windows in the test chamber, was recorded and a correction applied to the maximum absorbence value.

Specific optical densities were then normalized with respect to unit surface area of the sample $(D_m)$. The specific optical densities are defined by the following expression: $D_m(\text{corr}) = V/A'L \times A \text{ max. (corr)}$ where V equals test chamber volume; L equals optical path length; A' equals surface area of the sample; A max. (corr) equals A max. minus $A_w$, A max. (corr) minus maximum corrected absorbence during the test, A max. minus maximum measured absorbence during the test, $A_w$ minus absorbence caused by deposits on the window. In order to set forth a clear understanding of this invention, the following specific embodiments are described.

EXAMPLE 1

Di-2-Butoxyethyl Carbonate (BE Carbonate)

Diethyl carbonate 71g (0.6 mol), 212g (1.8 mol) 2-butyoxy ethanol (Butyl Cellosolve) and 0.6g sodium were heated 4 hours 153°-182° under a light nitrogen pressure while collecting 57g distillate (mostly ethanol). Methylene chloride was added to the reaction product, neutralized with dil. HCl, washed with saturated NaCl, water, dried with anhy. MgSO₄ and distilled. BE carbonate was collected in fr 3, 111°-112° 1 mm, 94% BE carbonate by gc. Yield 130g., 83%.

EXAMPLE 2

Di-2-(2-Ethoxyethoxy)Ethyl Carbonate (EEE Carbonate)

Diethyl carbonate 65g (0.55 mol), 221g (1.65 mol) 2-2-ethoxy-ethoxy) ethanol (Carbitol solvent) and 0.5g sodium were heated 125°-173° for 4½ hours while collecting 50g distillate (mostly ethanol). Methylene chloride added to the reaction product, neutralized with dil. HCl, washed with sat. NaCl, water, dried with anhy. MgSO₄ and distilled. EEE carbonate was collected in fr 3, 137°-138° 1 mm, 100% EEE carbonate by gc. Yield 117g., 73%.

EXAMPLE 3

Di-2-Ethylhexyl Carbonate (EH Carbonate)

Diethyl carbonate 66g (0.56 mol), 214g (1.68 mol) 2-ethyl hexanol and 0.6g sodium were heated 6 hours 138°-159°, 53g distillate, mostly ethanol. Reaction product was distilled without neutralizing sodium or water washes. EH carbonate was collected in fr 3, 113°-114° 1 mm, 100% EH carbonate by gc. Yield was 145g., 91%.

EXAMPLE 4

2-(2-Butoxyethoxy) Ethyl-Ethyl Carbonate (BEE-E Carbonate)

Diethyl carbonate 372g (3.16 mol), 340g (2.1 mol) 2-(2-butoxyethoxy) ethanol (Butyl Carbitol) and 1.4g sodium were heated 2½ hours 107°-130° while collecting 126g distillate (76% ethanol and 24% diethyl carbonate). Methylene chloride was added to the reaction product, neutralized with dil. HCl, washed with sat. NaHCO₃, water, dried with anhy. MgSO₄ and distilled. BEE-E carbonate was collected in fr 3, 116°-121° 2 mm, 98% BEE-E carbonate by gc and in fr 4, 110°-111° 1 mm, 100% BEE-E carbonate by gc. Yield was 301g., 62%.

EXAMPLE 5

1,4-Butanediol Bis(Ethyl Carbonate) (BD-E Carbonate)

Diethyl carbonate 260g (2.2 mol), 50g (0.55 mol) 1,4-butanediol and sodium catalyst were heated 6 hours 108°–121° while collecting 57g distillate. Reaction product was diluted with methylene chloride, neutralized with dil. HCl, washed with sat. NaCl, sat. NaHCO$_3$ and dried with anhy. MgSO$_4$ and distilled. BD-E carbonate (gc retention time (RT) 13.06) was collected in fr 2, 114°–120° 1 mm.

EXAMPLE 6

Poly 1,4-Butanediolethyl Carbonate (Poly BD-E Carbonate)

Diethyl carbonate 1180g (10 mol), 225g (2.5 mol) 1,4-butanediol and 3.5g sodium were heated 4½ hours 95°–114° while collecting 302g distillate (diethyl carbonate and ethanol). Reaction product was washed with water, neutralized with dil. HCl, washed with sat. NaHCO$_3$, dried with anhy. MgSO$_4$ and distilled to a pot temperature of 155° and a head temperature of 115°; gc of residue—73% 1,4-butanediol bis(ethyl carbonate) and 27% poly BD-E carbonate. Molecular weight shows 5.5 repeating units.

EXAMPLE 7

Poly 1,6-Hexanediolethyl Carbonate (Poly HD-E Carbonate)

Diethyl carbonate 226g (1.95 mol), 76g (0.65 mol) 1,6-hexanediol and 0.78g sodium were heated 5 hours 104°–108° while collecting 64g distillate (89% ethanol and 11% diethyl carbonate). By gc reaction product contained 15% polyhexanediol ethyl carbonate.

EXAMPLE 8

Tris(Ethoxy Carboxy Ethyl) Isocyanurate (THEIC-E Carbonate)

Diethyl carbonate 206g (1.75 mol), tris(hydroxyethyl) isocyanurate (THEIC) 92g (0.35 mol) and sodium catalyst were heated 3½ hours 121°–128° while collecting 47g distillate (86% ethanol). Reaction product was filtered and excess diethyl carbonate removed by distillation. Yield 126g., viscous, yellow oil.

EXAMPLE 9

Pentaerythritol Tetrakis (Ethyl Carbonate) (PE-E Carbonate)

Diethyl carbonate 212g (1.8 mol), pentaerythritol 41g (0.3 mol) and 0.75g sodium were heated 5 hours 111°–117° while collecting 59g distillate (89% ethanol). Excess diethyl carbonate removed by distillation. Yield of undistillable PE-E carbonate 96g.

Organic carbonate plasticizer processability, compatibility and thermal stability were observed while determining torque in meter grams with the Brabender Plastograph at 300° F. All samples displayed processing characteristics equal to or better than identical but conventional plasticizer-containing ones. Each batch was pressed at 300°–320° F. to 30–40 mils thickness. Longer term compatibility of these plasticizers was determined by visual observation of the Brabender mixed and pressed samples, noting whether the plasticizer exuded or bloomed from the sample. Observations for compatibility were made after storing the samples at ambient conditions for 6 months to one year.

The NBS smoke values are a useful indicator for sample smoke generation for the particular set of conditions of the NBS test and for the particular sample density, size and thickness. Other test conditions or other sample types will provide another set of smoke data not necessarily the same.

The symmetrical and unsymmetrical organic alkyl and alkoxyalkyl monocarbonates of this invention were blended in the following standard poly(vinyl chloride) resin-containing formulation:

| Masterbatch Formulation | Parts (based on 100 parts of resin) |
|---|---|
| PVC, Escambia 2160, Escambia Chem. Co., copolymer specific viscosity 0.02-ASTMD-1243-60-B | 100 |
| Synpron 744 (zinc octoate/barium phenate/aryl phosphite) | 2.0 |
| Admix 710 (epoxidized soybean oil) | 0.8 |
| Organic carbonate plasticizer | 36.0 |
| Zinc oxide (when used) | 1.7 |

Samples were prepared from Brabender extrudates. The results of the NBS smoke densities and compatibility of these organic carbonates are shown in the following table:

| | | ROC(O)OR' | | | |
|---|---|---|---|---|---|
| | | Dm(corr) NBS SMOKE Density | | | Compati- |
| Example | Plasticizer R=R' | fl | s | avg | bility |
| 10 | 2-butoxyethyl | 315 | 316 | 342 | C[1] |
| 11 | 2-(2-ethoxyethoxy)ethyl | 250 | 317 | 284 | C |
| 12 | 2-(2-ethoxyethoxy)ethyl | | | | |
| 13 | 2-(2-ethoxyethoxy)ethyl + ZnO | 176 | 201 | 189 | C |
| | | 179 | 223 | 201 | |
| 14 | 2-ethylhexyl | 427 | 461 | 444 | C |
| 15 | 2-ethylhexyl | | | | |
| 16 | 2-ethylhexyl + ZnO | 264 | 276 | 247 | C |
| | Comparative[2] | 615 | 228 | 422 | C |

[1] C — compatible
[2] di-2-ethylhexyl phthalate plasticizer at 36 phr

The unsymmetrical monocarbonates, and polycarbonates, as well as the symmetrical polycarbonates were added to the identical poly(vinyl chloride) resin Masterbatch formulation shown for the earlier symmetrical organic monocarbonates, but in 35 phr concentration. Sample preparation was by Brabender extruder. NBS smoke are shown below.

| | R(OC(O)OC$_2$H$_5$)$_{1-2}$ | | | |
|---|---|---|---|---|
| | | NBS Smoke Density Dm(corr) | | |
| Example | Plasticizer | fl | s | avg |
| 17 | C$_4$H$_9$O(CH$_2$)$_2$O(CH$_2$)OC(O)OC$_2$H$_5$ | 260 | 234 | 247 |
| 18 | C$_4$H$_9$O(CH$_2$)$_2$O(CH$_2$)$_2$OC(O)OC$_2$H$_5$, ZnO (2 phr) | 139 | 89 | 114 |
| 19 | C$_2$H$_5$OC(O)O(CH$_2$)$_4$OC(O)OC$_2$H$_5$ | 236 | 264 | 250 |
| 20 | polybutanediol carbonate | 223 | 293 | 258 |
| 21 | polybutanediol carbonate | 265 | 290 | 276 |
| 22 | polybutanediol carbonate, ZnO (1 phr) | 160 | 194 | 177 |
| 23 | polyhexanediol carbonate | 279 | 246 | 263 |

Compositions containing conventional plasticizers are also successfully reduced in smoke by the organic carbonates in accordance with the present invention as illustrated below:

| Masterbatch Formulation | |
|---|---|
| PVC, Blacar 1732, Tenneco Chem. homopolymer specific viscosity 0.40–0.44 | 100 |
| di-2-ethylhexylphthalate (DOP) | 25 |
| 2,2,4-trimethyl-1,3-pentanediol diisobutyrate (TXIB) | 15 |
| Thermal stabilizer (Mark 275) dibutyltin bis isooctyl maleate | 2 |

| Example | Plasticizer Additive | NBS Smoke Density | flDm(corr)s |
|---|---|---|---|
| Comparative | 5 phr TXIB | 111 | 132 |
| 24 | Poly BD-E Carbonate 45 phr (no DOP present) | 75 | 40 |
| 25 | BEE Carbonate 35 phr (no TXIB present) | 96 | 78 |
| 26 | Poly BD-E Carbonate 45 phr and BEE Carbonate 35 phr (no TXIB or DOP present) | 65 | 34 |

What is claimed is:

1. A smoke-suppressant composition comprising a chlorine-containing polymer and a smoke suppressant amount of a symmetrical or unsymmetrical organic carbonate plasticizer selected from the group consisting of di-2-butoxyethyl carbonate, di-2-(2-ethoxyethoxy)ethyl carbonate, di-2-ethylhexyl carbonate, 2-(2-butoxyethoxy)ethyl-ethyl carbonate, [1,4-(butanediol-bis(ethyl carbonate),] $C_2H_5(OC(O)O(CH_2)_4)_xOC(O)OC_2H_5$ and $C_2H_5(OC(O)O(CH_2)_6)_xOC(O)OC_2H_5$ wherein x is 2 to 6.

2. The smoke-suppressant composition of claim 1 in which said organic carbonate is present in an amount within the range of from about 1 to about 80 parts per 100 parts of said chlorine-containing polymer.

3. The smoke-suppressant composition of claim 1 in which said organic carbonate is present in an amount within the range of from about 5 to about 40 parts per 100 parts of said chlorine-containing polymer.

4. The smoke-suppressant composition of claim 1 comprising zinc oxide in an amount within the range of from about 0.01 to about 20 parts per 100 parts of said chlorine-containing polymer.

5. The smoke-suppressant composition of claim 1 in which said chlorine-containing polymer is poly(vinyl chloride) homopolymer.

6. The smoke-suppressant composition of claim 1 in which said chlorine-containing polymer is vinyl chloride copolymerized with up to about 50% by weight of at least one olefinically unsaturated monomer.

* * * * *